No. 840,155. PATENTED JAN. 1, 1907.
J. P. OLSON.
SAW GAGE AND JOINTER.
APPLICATION FILED JULY 24, 1905.
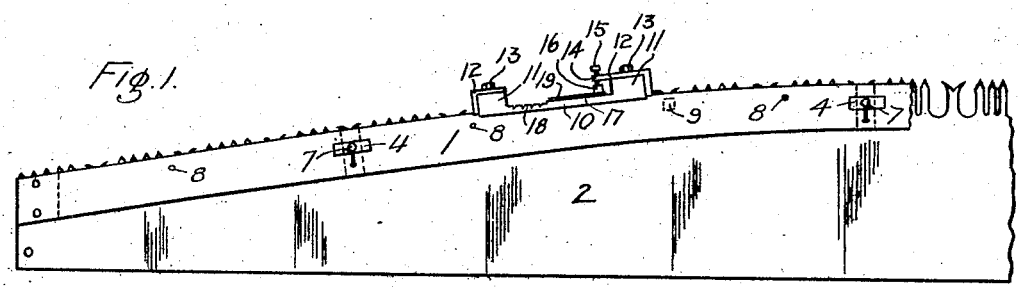
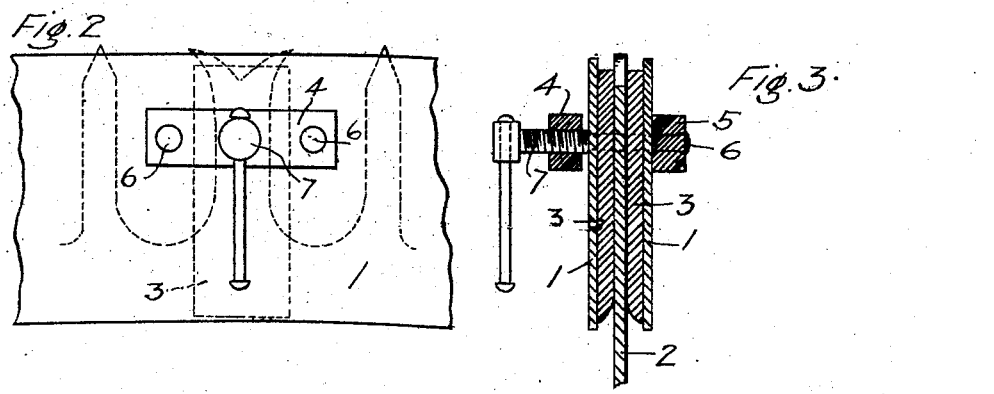
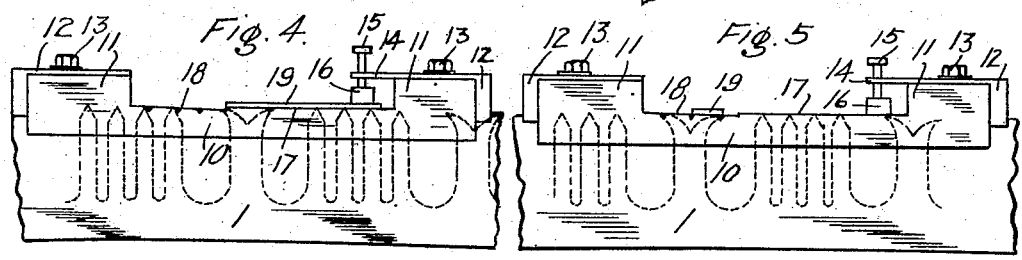
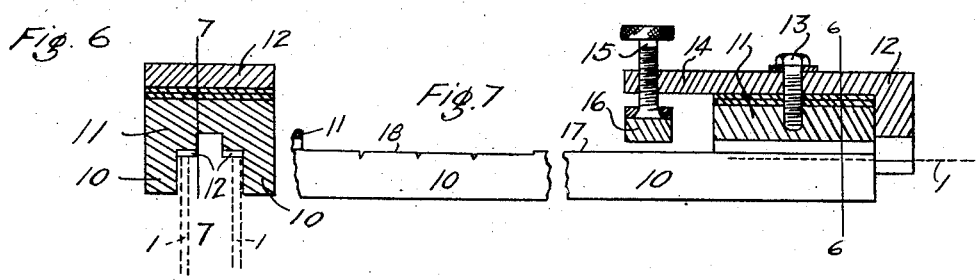
Witnesses
M. A. Van House
Paul V. Tuttle
Inventor
John P. Olson
By P. J. Elliott
Attorney

UNITED STATES PATENT OFFICE.

JOHN P. OLSON, OF TACOMA, WASHINGTON.

SAW GAGE AND JOINTER.

No. 840,155.　　　　Specification of Letters Patent.　　　　Patented Jan. 1, 1907.

Application filed July 24, 1905. Serial No. 271,031.

*To all whom it may concern:*

Be it known that I, JOHN P. OLSON, a citizen of the United States of America, residing at Tacoma, in the county of Pierce and State of Washington, have invented certain new and useful Improvements in Saw Gages and Jointers, of which the following is a specification, reference being had therein to the accompanying drawings.

This invention relates to devices which being applied to a saw indicate the lines to which the teeth and rakers must be jointed, and is more particularly an improvement in the raker gage and jointer patented by me on January 5, 1904, and numbered 749,090.

The objects of my invention are to improve the means of clamping the guide-bars to the saw and to improve the construction of the sliding gage. I attain these objects by the devices illustrated in the accompanying drawings, in which—

Figure 1 is a side view of a part of a saw with my saw gage and jointer secured thereto in operative position. Fig. 2 is an enlarged side view showing the clamp, and Fig. 3 is a section thereof. Figs. 4 and 5 show the sliding gage in use to joint the teeth and to joint the rakers, respectively. Fig. 6 is a cross-section of the sliding gage on the line 6 6 in Fig. 7, and Fig. 7 is a longitudinal section thereof on the line 7 7 in Fig. 6.

Similar numerals of reference refer to similar parts throughout the several views.

The guide-bars 1 are curved to correspond with the desired shape of the saw 2 and are secured to each side of the saw 2 by the clamps, of which I prefer to provide three or four for each saw. At each clamp are secured to the inside of the bars 1 the clamp-pieces 3, adapted to be pressed on each side of the tooth or raker to clamp the bars thereto. The clamp itself is formed of the yoke-piece 4 on the outside of one of the bars 1, connected to the other yoke-piece 5 on the outside of the other bar 1 by the rods 6, which pass through holes in the bars 1 on each side of the raker, and the screw 7, passing through the yoke-piece 4 and bearing against the bar 1. The bars are also connected together at intervals by the pins 8, which are so spaced as to come in the space beside a raker. The washers 9 are also provided at suitable intervals, so as to engage against the rakers to keep the guide-bars 1 parallel.

The sliding gage is formed with two side parts 10, joining the end or head parts 11, which span across the guide-bars 1. Each head part 11 is provided with a removable part 12, which extends from the top of the head part 11 and down over the end of the sliding gage to engage the guide-bars 1 and to support the sliding gage. The removable parts 12 are secured to the head parts 11 by means of the screws 13 and are adapted to receive layers of paper, wood, iron, or other material between them and the head parts 11, thus adjusting the height of the side parts 10 with respect to the guide-bars 1. The sliding gage does not touch the saw or the guide-bars except through the removable adjustable parts 12. One of the parts 12 has an extension 14, through which the screw 15 passes. The cross-piece 16 is secured to the end of the screw 15 in such manner as to be raised and lowered thereby, but without turning therewith. This cross-piece 16 is long enough to extend from one side part 10 to the other. The upper surfaces of the two side parts 10 are arranged with a horizontal portion 17 on the end of the sliding gage, over which the cross-piece 16 is held, and a lower inclined portion 18, which is preferably provided with notches or other guide-points thereon.

The operation of my device is as follows: The guide-bars 1 are first lightly clamped in approximately their correct position. Then the sliding gage is placed thereon, the cross-bar 16 being screwed down on the side parts 10. The bars 1 are then adjusted so that the teeth of the saw 2 which are most worn away just reach to the lower side of the cross-piece 16. Then a file 19 is clamped between the horizontal portion 17 and the cross-piece 16. The sliding gage is then slid the whole length of the saw, and the teeth are all jointed to their correct levels on the proper curvature of the saw. Then the file 19 is removed from its clamped position, as above stated, and is now used to joint the rakers, as shown in Fig. 5. This jointing of the rakers is done by moving the sliding gage until the raker comes opposite a predetermined notch in the inclined portion 18 of the sides 10 and then operating the file 19 across the saw at the point. As soon as one raker has been jointed the sliding gage is then moved to the next until all are done.

Having described my invention, what I claim is—

In a saw-gage, the combination of a pair of guide-bars on each side of a saw, clampingpieces secured to the inner edges thereof at suitable positions, a pair of yokes outside of said guide-bars and joined by two rods, one of said rods being adapted to be on each side of a saw-tooth or saw-raker, and a clamp-screw passing through one of said yokes and adapted to screw against the adjacent guide-bar whereby the other yoke is pressed against the other guide-bar and said bars are clamped to the saw.

In testimony whereof I affix my signature in presence of two witnesses.

JOHN P. OLSON.

Witnesses:
M. H. COREY,
M. A. VAN HOUSE.